United States Patent [19]
Paulick

[11] Patent Number: 5,854,549
[45] Date of Patent: Dec. 29, 1998

[54] CONTACT ARRANGEMENT HAVING AN AUXILIARY CONTACT

[75] Inventor: Thomas Eugene Paulick, Palatine, Ill.

[73] Assignee: Motorola, Inc., Schaumburg, Ill.

[21] Appl. No.: 710,912

[22] Filed: Sep. 24, 1996

[51] Int. Cl.[6] .................................................. H01M 10/46
[52] U.S. Cl. ........................................... 320/110; 320/112
[58] Field of Search .................................... 320/107, 106,
320/108, 110, 111, 112, 101, 104; 429/65,
97, 99, 100; D13/103, 107

[56] References Cited

U.S. PATENT DOCUMENTS

| | | |
|---|---|---|
| 4,147,838 | 4/1979 | Leffingwell . |
| 4,389,469 | 6/1983 | Nicholls . |
| 4,464,445 | 8/1984 | Matti . |
| 4,554,221 | 11/1985 | Schmid . |
| 4,628,243 | 12/1986 | Hodgman et al. ...................... 320/106 |
| 4,680,527 | 7/1987 | Benenati et al. ......................... 320/112 |
| 4,829,226 | 5/1989 | Nakamura . |
| 4,861,685 | 8/1989 | Tien et al. . |
| 4,885,523 | 12/1989 | Koenck . |
| 5,111,128 | 5/1992 | Branan, Jr. er al. ..................... 320/106 |
| 5,122,427 | 6/1992 | Flowers et al. . |
| 5,136,229 | 8/1992 | Galvin . |
| 5,191,275 | 3/1993 | Singhal . |
| 5,296,314 | 3/1994 | Millauer . |
| 5,300,372 | 4/1994 | Aksoy et al. ......................... 429/99 X |
| 5,368,956 | 11/1994 | Gruenstern et al. . |
| 5,426,358 | 6/1995 | Leiserson et al. . |
| 5,443,924 | 8/1995 | Spellman .................................. 429/65 |
| 5,470,255 | 11/1995 | McCleerey . |
| 5,644,208 | 7/1997 | Abiven ................................... 320/118 |

FOREIGN PATENT DOCUMENTS

| | | |
|---|---|---|
| 478309A2 | 4/1992 | European Pat. Off. . |
| 478309A3 | 4/1992 | European Pat. Off. . |
| 511740A1 | 11/1992 | European Pat. Off. . |
| 2061643 | 5/1981 | United Kingdom . |
| 2281810 | 3/1995 | United Kingdom . |
| 9600435 | 1/1997 | WIPO . |

OTHER PUBLICATIONS

Gates Energy Products, OEM Sales, Energizer Battery Product Brochure, IntelliLink™ System., no date.

*Primary Examiner*—Edward H. Tso
*Attorney, Agent, or Firm*—John J. King

[57] ABSTRACT

A novel contact arrangement enables selective charging of battery packs or the transfer of information between a battery pack and an electronic device. According to one novel feature of the invention, a charging contact (408) is positioned in a region (410) outside of the area covered by the contacts of conventional cells. Therefore, a charging contact terminal of an electronic device will only apply charging current to rechargeable cells to avoid unintentional charging of any primary cells. According to alternate embodiments, battery contacts can be placed at different locations to selectively charge batteries depending upon the battery type. According to other embodiments, information or data transfer contacts (406) can be located at different locations to enable the transfer of information.

22 Claims, 4 Drawing Sheets

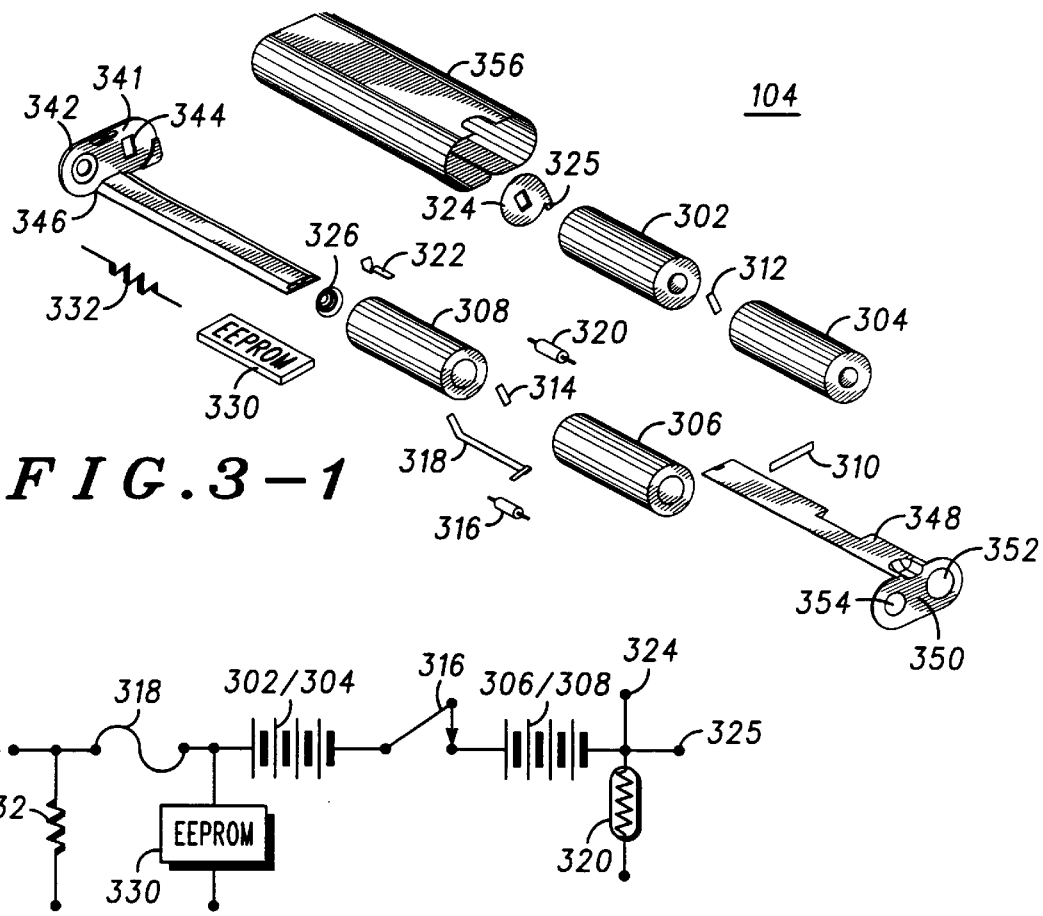
FIG. 3-1
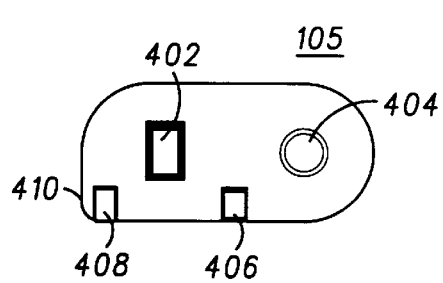
FIG. 3-2
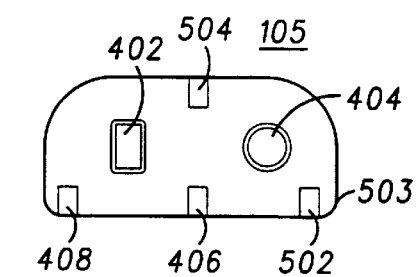
FIG. 4-1  FIG. 4-2
FIG. 5-1  FIG. 5-2

CONTACT ARRANGEMENT HAVING AN AUXILIARY CONTACT

FIELD OF THE INVENTION

The present invention is directed to battery contacts, and more particularly to a battery contact arrangement having a separate charging contact.

BACKGROUND OF THE INVENTION

As electronic components have become more advanced and smaller in size, portable electronic devices have become more common. Similarly, battery technology has also advanced, enabling a variety of rechargeable cells in addition to standard alkaline cells. Many electronic devices enable recharging of cells within the device. However, it is important not to apply a charging current to a cell which is not designed to be recharged. Also, rechargeable cells have different charging requirements and characteristics.

Conventional batteries and associated battery chargers have been developed to enable charging of rechargeable cells at the positive contact of the battery, while preventing charging standard or non-rechargeable cells. However, such conventional arrangements require special contact arrangements which will enable charging of a rechargeable cell but avoid contact to the positive terminal of a standard cell. In particular, both the positive contact of the battery and the positive contact of the charger must be modified. More importantly, such contact arrangements of the prior art are limited in their functionality. Accordingly, there is a need for a battery contact arrangement and/or a corresponding charging contact arrangement which will selectively charge a rechargeable battery or transfer information between a battery and a charger.

BRIEF DESCRIPTION OF THE DRAWINGS

FIG. 3-1 is an exploded view of a battery having a contact arrangement according to the present invention;

FIG. 3-2 is a circuit diagram of a battery having a contact arrangement according to FIG. 3-1;

FIG. 4-1 and 4-2 are a top plan view of battery contact arrangement 105 and a cross-sectional view of radio telephone 102 taken at lines A—A showing contact arrangement 103;

FIG. 5-1 and 5-2 are an alternate embodiment of a top plan view of battery contact arrangement 103 and cross sectional view of radio telephone 105 taken at lines A—A showing contact arrangement 103;

FIG. 6-1 and 6-2 are a second alternate embodiment of a top plan view of battery contact arrangement 103 and cross sectional view of radio telephone 105 taken at lines A—A showing contact arrangement 103;

FIG. 7-1 and 7-2 are a third alternate embodiment of a top plan view of battery contact arrangement 103 and cross sectional view of radio telephone 105 taken at lines A—A showing contact arrangement 103; and FIG. 8-1 and 8-2 are a fourth alternate embodiment of a top plan view of battery contact arrangement 103 and cross sectional view of radio telephone 105 taken at lines A—A showing contact arrangement 103.

DESCRIPTION OF THE PREFERRED EMBODIMENTS

The present invention is directed to a battery contact arrangement which enables selectively charging (or prevents the charging) of batteries or the transfer of information between a battery and an electronic device. The present invention finds particular application in electronic devices and battery packs adapted to receive conventional cells such as AA cells, but could be employed in any type of battery, or even a power pack having a single cell. According to one novel feature of the invention, a charging contact is positioned in a region outside of the area covered by the contacts of conventional cells. Accordingly, the charging contact will only apply charging current to rechargeable cells to avoid unintentional charging of any kind of primary cell (i.e. cells not in a battery pack designed for charging). According to alternate embodiments, battery contacts can be placed at different locations to selectively charge batteries depending upon the battery type. That is, a battery would preferably have a single charging contact which corresponds to one of a plurality of contacts in the electronic device. Accordingly, the battery would be correctly charged according to a predetermined algorithm associated with the battery type. According to other embodiments, information or data transfer contacts can be located at different locations to enable the transfer of information. For example, a charger could determine the type of battery based upon the voltage of a particular contact, as determined by a resistor in the battery or charger. Similarly, a battery pack having a memory device, conventionally called a smart battery, could have a contact in another region enabling the electronic device to determine information regarding the battery. Any configuration of the above contacts could be employed according to the present invention.

Figure 1:
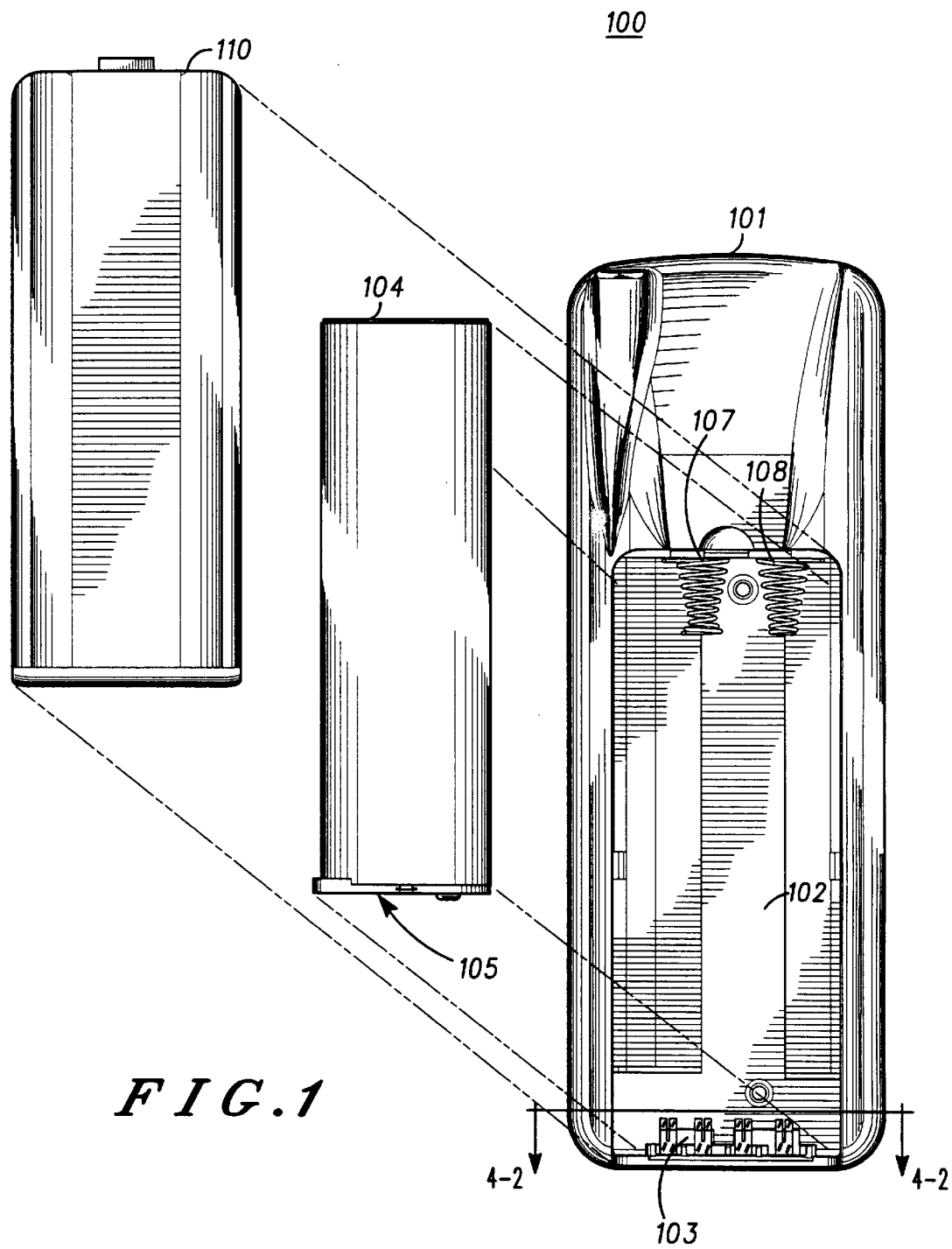
FIG. 1 is an exploded view of a portable electronic device having a contact arrangement according to the present invention.

Turning first to FIG. 1, an exploded view of an electronic device 100, such as a wireless communication device 101, is shown. Wireless communication device 101 preferably includes a recess 102 having a contact arrangement 103 for receiving a battery pack 104. A battery contact arrangement 105 is adapted to mate with device contact arrangement 103 of the wireless communication device. The recess preferably includes springs 107 and 108 to enable a good connection between battery contact arrangement 105 and device contact arrangement 103. The springs 107 and 108 may have a different size ends to fit into corresponding recesses of battery pack 104 to enable a user to determine the proper orientation of the battery. Finally, a battery cover 110 is adapted to encapsulate and retain battery pack 104 within recess 102.

Figure 2:
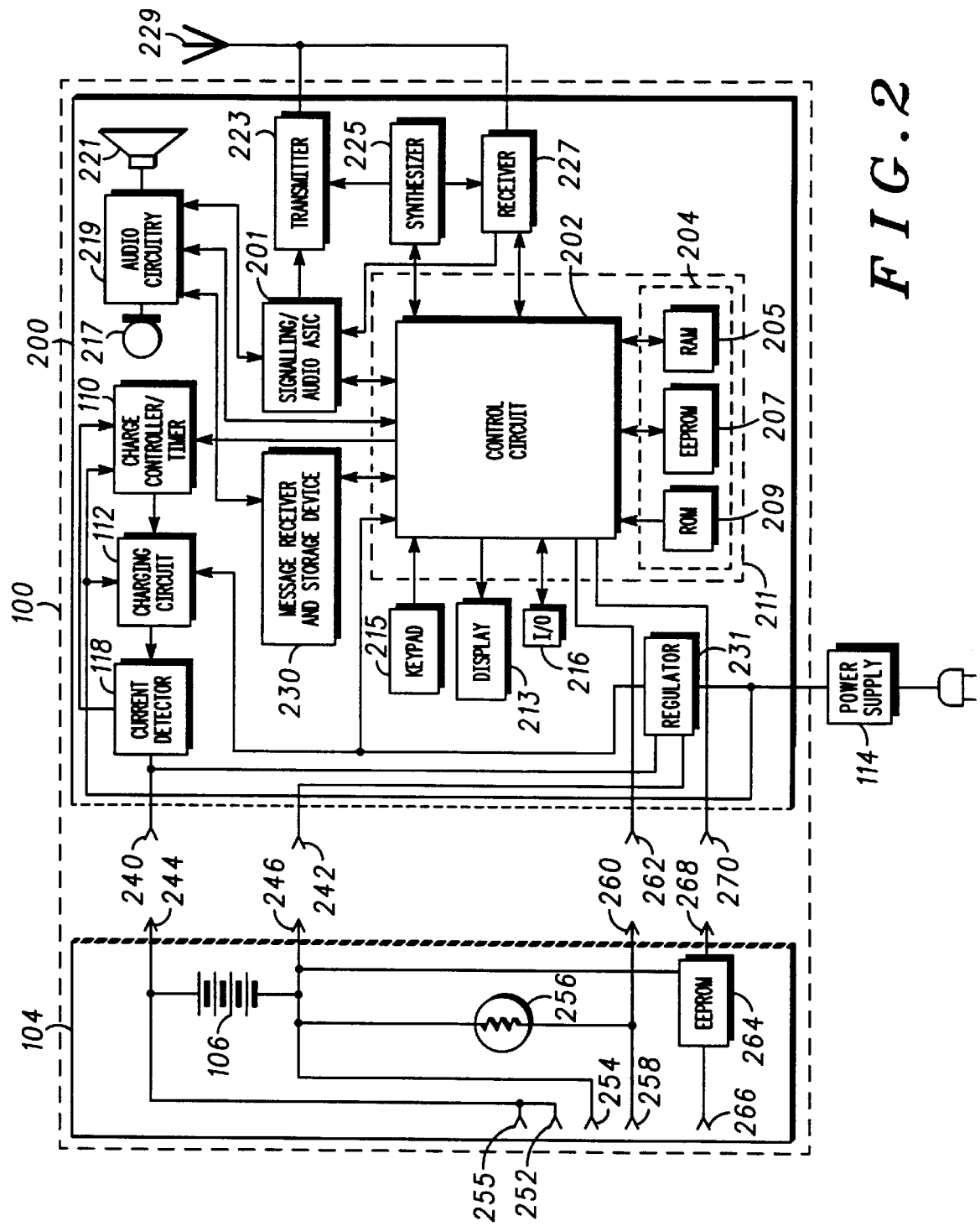
FIG. 2 is a block diagram of a radio telephone incorporating the contact arrangement of the present invention.

Turning now to FIG. 2, a block diagram of a wireless communication device 101 and battery pack 104 incorporating the contact arrangement of the present invention is shown. In particular, transceiver portion 200 preferably comprises a signaling/audio ASIC 201, such as a CMOS ASIC available from Motorola, Inc. and control circuit 202, such as a 68HC11 microprocessor also available from Motorola, Inc., or some other processing circuit, which combine to generate the necessary communication protocol for communicating with a base station such as a cellular base station. Control circuit 202 uses memory 204 comprising RAM 205, EEPROM 207, and ROM 209, preferably consolidated in one package 211, to execute the steps necessary to generate the protocol and to perform other functions for the wireless communication device, such as writing to a display 213, accepting information from a keypad 215, accepting input/output information by way of a connector 216, or controlling a frequency synthesizer 225. ASIC 201 processes audio transformed by audio circuitry 219 from a microphone 217 and to a speaker 221.

Transceiver portion 200 processes the radio frequency signals. In particular, a transmitter 223 transmits through an antenna 229 using carrier frequencies produced by a frequency synthesizer 225. Information received by antenna 229 of the mobile unit enters receiver 227 which demodulates the symbols using the carrier frequencies from frequency synthesizer 225. The mobile unit may optionally include a message receiver and storage device 230 including digital signal processing means. Transceiver portion 200 further includes a regulator 231 which receives power by way of a power supply 114 and provides a regulated output to charging circuit 112. Power supply 114 could be a transformer converting conventional AC power to a DC voltage, or could be a cigarette lighter adapter coupling DC power of an automobile to the device. Transceiver portion 200 further includes power contact 240 and ground contact 242 adapted to be coupled to a battery contact 244 and a ground contact 246, respectively, of battery 104.

Battery 104 preferably comprises a rechargeable cells 106 coupled between battery contact 244 and ground contact 246. Battery pack 104 also preferably includes a contact 255 which is either coupled to charging contact 252 or provides an open circuit. When coupled to a charging base, the charging base can identify the battery type based upon whether it is an open circuit. Additionally, a thermistor 256 could be coupled to ground contact 246. Thermistor 256 could provide information about the battery, such as the temperature of the battery, to enable efficient charging of the battery. Alternatively, contact 255 could be coupled a discrete resistor within the battery to enable control circuit 200 to identify the type of battery when contact 255 is coupled to a charging base based upon the value of the resistor. Battery pack 104 could also include a contact 258 which could be coupled to a charger and a contact 260 adapted to mate with a contact 262 of transceiver portion 200 for providing the temperature information to transceiver portion 200.

Battery pack 104 could include additional components such as an EEPROM 264 coupled to a contact 266 adapted to mate with a corresponding contact of a charging base. Battery pack 104 could additionally include a contact 268 adapted to mate with a contact 270 of the transceiver portion 200. EEPROM 264 could store information relevant to the battery to enable the charging base or transceiver portion to correctly charge the battery according to the present invention. Control circuit 202 could control charging circuit 112 differently depending upon the determination of the type of battery or information received from EEPROM 264. For example, less charging current may be required to vary the voltage of a lithium ion battery than a nickel cadmium battery or a nickel metal hydride battery.

Turning now to FIG. 3-1, an exploded view of a power device such as a battery pack 104 according to the present invention is shown. The battery pack preferably includes conventional cells 302 through 308, such as rechargeable AA cells, having positive nodes and negative nodes. However, the present invention could apply any number of cells, including a single cell. According to the embodiment of FIG. 3-1, a conductive strip 312 couples the positive terminal of cell 304 to the negative terminal of cell 306. Similarly, conductive strip 312 couples cell 302 to 304, while conductive strip 314 couples cell 306 to 308. Battery pack 104 preferably includes other elements such as a polyswitch 316, a thermal fuse 318, and a thermistor 320. A thermistor contact 322 enables an external contact to thermistor 320. A negative contact 324 includes a charging contact 325 which enables the charging of the battery when a current is applied to the negative terminal of battery 302. The location of charging contact 325 will be described in more detail in reference to the remaining figures. Additionally, a positive contact 326 enables an external connection to the positive contact of the battery pack. For a smart battery, a microprocessor 330 or other device for storing information could be included. Similarly, a resistor 332 or other discrete component for identifying the battery type could also be included.

Finally, the cells and components are packaged in battery pack 104 with support structure 340 having a contact plate or contact plate 341 for enabling external connection to the battery pack. In particular, a recess 342 is adapted to receive positive contact 326, while a separate recess 344 is adapted to receive negative contact 324. Finally, a thermistor recess 346 is adapted to receive thermistor contact 322. A second support member 348 includes an end portion 350 having recesses 352 and 354. Recesses 352 and 354 may be of different sizes and are adapted to receive the ends of springs 106 and 108 respectively. The different size recesses enables a user to determine the proper orientation of a battery. Although the structure of FIG. 3-1 provides an exemplary embodiment of the battery structure, any structure of battery could be employed, including any number or configuration of cells or other elements.

Turning now to FIG. 3-2, a circuit diagram shows the electrical 20 connection of battery 3-1. Preferably a polyswitch 316 is coupled between cells 302/304 and cells 306/308. Also, a thermal fuse 318 is preferably coupled between the positive contact. A thermistor 320 is coupled to negative contact 324. A separate charging contact 325 is also provided as will be described in more detail below. An EEPROM 330 or other memory device is also coupled to the positive contact. Finally, a resistor 332 for identifying the battery type. Although the exemplary circuit of FIG. 3-2 provides one layout for various elements, other circuitry implementing one or more of the elements shown could be employed.

Turning now to FIG. 4, FIG. 4-1 shows a battery contact arrangement 105 for battery pack 104. In particular, a contact plate incorporating battery contact arrangement 105 is generally shaped to encapsulate the cells, such as conventional cylindrical cells. For a pack having a single cell in cross-section, the contact plate is generally circular for cylindrical cells, while a battery pack having two cells in cross section has a contact plate which is generally oval. The contact arrangement preferably includes a negative contact 402, a positive contact 404 and other contacts. As shown in FIG. 4-1, a thermistor contact 406 and a charging contact 408 are incorporated in the battery pack. Charging contact 408 is preferably located in a region 410 defining a "corner" or flange at least partially outside of the region occupied by the cells. Although both thermistor contact 406 and charging contact 408 are shown in FIG. 4-1, the thermistor contact is optional, and could be removed or replaced with a different contact. Alternatively, the charging contact could be positioned in place of the thermistor contact, or at some other point at least partially outside the region occupied by the cells below the contact plate, eliminating the need for any region 410. Although the charging contact is shown in lower left region of battery contact arrangement 105, the charging contact could be on any of the flanges of the contact arrangement. Also, an additional contact opposite contact 406 could be incorporated in the embodiment of FIG. 4-1.

Turning now to FIG. 4-2, the device contact arrangement 103 of the wireless communication device is shown in the cross-section taken at section A—A of FIG. 1. In particular, a corresponding negative contact terminal 422, positive contact terminal 424, thermistor contact terminal 426, and charging contact terminal 428 are adapted to couple the corresponding contacts of battery pack 104.

Turning now to FIG. 5, an alternate embodiment of battery contact arrangement 105 is shown. In particular, two flanges are provided to enable an additional contact in a region outside the region of the cells of the battery pack. In particular, in addition to contacts 406 and 408 of FIG. 1, a contact 502 could be positioned in region 503 at least partially outside of the standard cells. In addition, a contact 504 is shown located opposite contact 406. Accordingly, the four additional contacts could be employed in the embodiment of FIG. 5-1. Although four additional contacts are shown, any combination of the additional contacts could be applied. Similarly, the functionality of the selected additional contacts could vary. Some possible uses of the contacts could include a thermistor, battery identification type, smart battery access, or any other use. As shown in FIG. 5-2, additional contact terminals 522, 524 and 526 corresponding to contacts 502, 504, and 406 respectively are shown. The particular arrangement of the contacts and corresponding contact terminals is a matter of design choice, and could be selected depending upon a number of factors, including the location of terminals on the circuit board, or compatibility with related products or standards.

Figures 1, 2, 6:
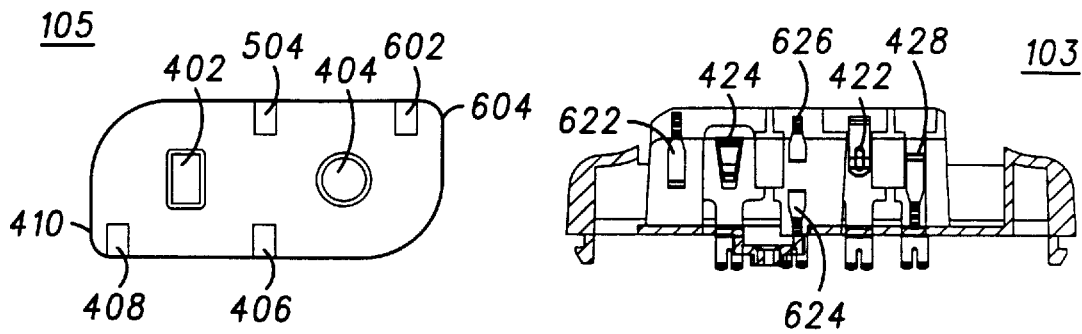

Turning to FIG. 6, another alternate embodiment of the contact arrangement is shown. In FIG. 6-1, the battery contact arrangement 105 incorporates two flanges which are located diagonally from one another. The arrangement of FIG. 6-1 also enables four additional contacts outside the conventional contact area. In the embodiment of FIG. 6-1, contact 602 in region 604 replaces contact 502 of FIG. 5-1. Also, as can be seen in FIG. 6-2, contact terminal 622 is incorporated in the contact arrangement of the wireless communication device in place contact terminal 502 of FIG. 5-2. Although the flanges were added to the lower left and upper right sections of the contact plate as shown, the corners could be added to the upper left and lower right.

Figures 1, 2, 7:
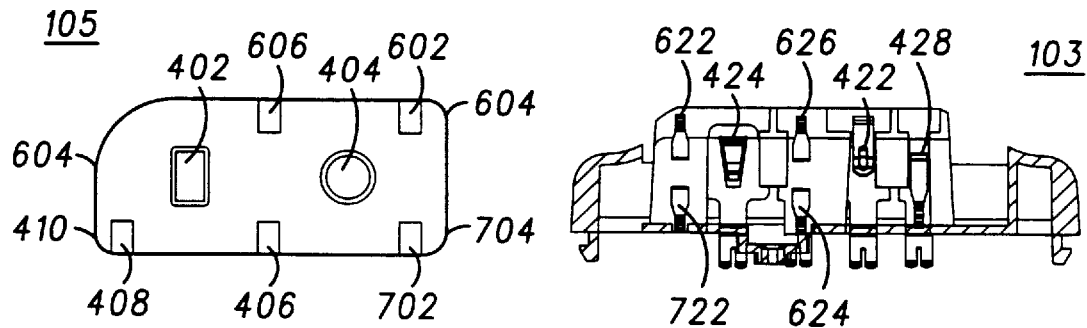

Turning now to FIG. 7-1, another alternate embodiment of the present invention is shown. In particular, three flanges are used to define regions outside the standard cell area leaving only one region which is rounded. In addition to the corners of FIG. 6-1, a contact 702 in a region 704 is included to provide five contacts as shown. Additional contact terminal 722 which corresponds to contact 702 is shown in FIG. 7-2. Any one of the four corners could be selected as the region which is rounded.

Figures 1, 2, 8:
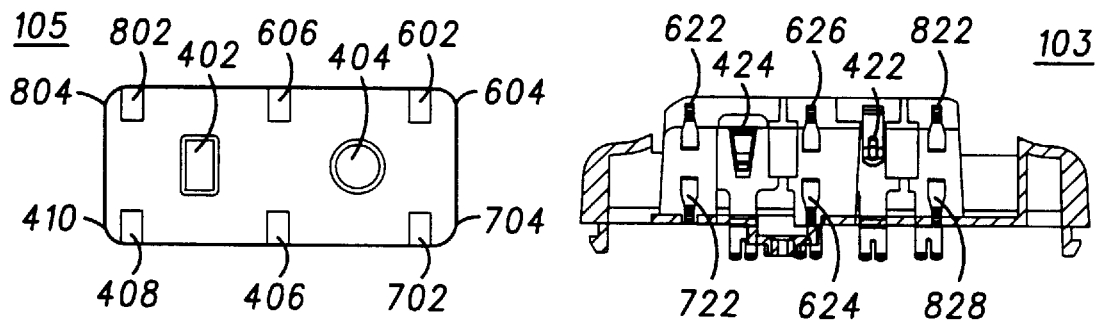

Finally, a contact arrangement incorporating four flanges is shown in FIG. 8. According to the embodiment of FIG. 8, an additional contact 802 in region 804 in addition to those contacts shown in FIG. 7-1. The contact arrangement of FIG. 8 enables six contacts outside of the standard contact region of the cells. As shown in FIG. 8-2, contacts 822 and 828 are provided to mate with contacts 802 and 408 as shown.

According to the present invention, contact arrangement of batteries and corresponding contact terminals of an electronic device such as a wireless communication device can enable the selective charging of a battery. In particular, by placing a charging contact in a region outside of the region normally occupied by conventional cells, such as cylindrical AA cells, the charging terminal of the wireless communication device will only make contact to and charge a battery which is adapted to be charged. Placing the contact in a region outside of the region normally occupied by the standard cell may create a distinctive configuration or shape of the battery pack which enables the proper insertion (or prohibit incorrect assertion) of the battery pack into a recess of the electronic device. By including multiple regions or corners, additional locations for contacts can be formed. In particular, two regions will enable at least four additional contacts, three regions will enable at least five additional contacts, while four regions will enable at least six additional contacts. The location of terminals in particular regions can be selectively chosen to enable maintenance of the battery or the transfer of information, depending on the battery type and functionality of the electronic device. For example, the electronic device could be adapted to have three charging contacts, each contact providing a different charging scheme. Accordingly, a particular battery having a charging contact located in a particular region would only be charged by the corresponding charging contact terminal in the battery. Therefore, the battery will be properly charged by the electronic device. Alternatively, the additional contacts could be used to identify the battery type or provide information from memories located in the battery.

Although the invention has been described and illustrated in the above description and drawings, it is understood that this description is given by way of example only and that numerous changes and modifications can be made by those skilled in the art without departing from the true spirit and scope of the invention. Although the present invention finds particular application in portable cellular radiotelephones, the invention could be applied to any portable device, including pagers, electronic organizers, or computers. My invention should be limited only by the following claims.

I claim:

1. A contact arrangement for a power device comprising at least one cell, said contact arrangement comprising:

an external positive contact coupled to a positive node of said at least one cell;

an external negative contact coupled to a negative node of said at least one cell; and an external charging contact located at least partially outside an area occupied by said at least one cell.

2. The contact arrangement according to claim 1 wherein said external charging contact is coupled to said negative node.

3. The contact arrangement according to claim 1 further comprising a contact plate.

4. The contact arrangement according to claim 3 wherein said contact plate comprises a flange for receiving said external charging contact.

5. The contact arrangement according to claim 4 wherein said contact plate further adapted to receive said external positive contact and said external negative contact.

6. The contact arrangement according to claim 3 wherein said power device comprises a plurality of cells.

7. The contact arrangement according to claim 6 wherein said external charging contact is located between an area occupied by said plurality of cell.

8. The contact arrangement according to claim 6 wherein said contact plate further comprises a flange for receiving a second external auxiliary contact.

9. A contact arrangement for a power device comprising at least one cell, said contact arrangement comprising:

a packaging encapsulating said at least one cell;

an external positive contact coupled to a positive node of said at least one cell;

an external negative contact coupled to a negative node of said at least one cell; and an external charging contact associated with said packaging and located on said packaging at least partially outside an area adjacent said positive node and said negative node of said at least one cell.

10. The contact arrangement according to claim 9 wherein said packaging further comprises a contact plate adapted to receive said external positive contact and said external negative contact.

11. The contact arrangement according to claim 10 wherein said power device comprises a plurality of cells.

12. The contact arrangement according to claim 11 further comprising an external auxiliary contact located between an area occupied by said plurality of cells.

13. The contact arrangement according to claim 10 wherein said contact plate comprises a flange for receiving said external charging contact.

14. The contact arrangement according to claim 13 further comprising an external auxiliary contact is located between an area occupied by said plurality of cells.

15. A contact arrangement for a battery pack comprising a plurality of cells encapsulated in a packaging, said contact arrangement comprising:

a positive contact coupled to a positive node of a first cell of said plurality of cells;

a negative contact coupled to a negative node of a second cell of said plurality of cells;

a charging contact coupled to said negative contact; and a contact plate associated with said packaging and adapted to receive said positive contact and said negative contact, said contact plate further comprising a flange located at least partially outside an area adjacent said positive node of said first cell and said negative node of said second cell of said plurality of cells for receiving said charging contact.

16. A contact arrangement comprising:

a recess adapted to receive at least one cell;

a positive contact thermal located in said recess and adapted to be coupled to a positive contact of said at least one cell;

a negative contact terminal located in said recess and adapted to be coupled to a negative contact of said at least one cell; and a charging contact terminal located in an area at least partially outside the area occupied by said at least one cell.

17. The contact arrangement according to claim 16 wherein said recess is adapted to receive a plurality of cells.

18. The contact arrangement according to claim 17 wherein said charging contact terminal is located between the area occupied said plurality of cells.

19. The contact arrangement according to claim 16 wherein said charging contact terminal is adapted to be coupled to a flange of a battery pack.

20. A contact arrangement comprising:

a recess adapted to receive a plurality of cells encapsulated in a battery pack;

a positive contact terminal located in said recess adapted to be coupled to a positive contact of said battery pack;

a negative contact terminal located in said recess adapted to be coupled to a negative contact of said battery pack; and a charging contact terminal located in a region outside the area occupied by said plurality of cells and adapted to receive a flange of said battery pack.

21. The contact arrangement according to claim 20 further comprising an auxiliary contact terminal located between an area occupied by said plurality of cells.

22. A contact arrangement comprising:

a plurality of cells encapsulated in a packaging;

a positive contact coupled to a positive node of a first cell of said plurality of cells;

a negative contact coupled to a negative node of a second cell of said plurality of cells;

a contact plate associated with said packaging and adapted to receive said positive contact and said negative contact, said contact plate further comprising a flange located at least partially outside an area occupied by said plurality of cells for receiving a charging contact; and a receiving terminal having a positive contact terminal coupled to said positive contact, a negative contact terminal coupled to said negative contact, and a charging contact terminal coupled to said charging contact.

* * * * *